United States Patent [19]
Dieterich

[11] Patent Number: 6,138,051
[45] Date of Patent: Oct. 24, 2000

[54] METHOD AND APPARATUS FOR EVALUATING AN AUDIO DECODER

[75] Inventor: Charles B. Dieterich, Kingston, N.J.

[73] Assignee: Sarnoff Corporation, Princeton, N.J.

[21] Appl. No.: 08/787,429

[22] Filed: Jan. 22, 1997

Related U.S. Application Data

[60] Provisional application No. 60/010,434, Jan. 23, 1996.
[51] Int. Cl.[7] ................................ G06F 17/00
[52] U.S. Cl. ........................... 700/94; 381/58
[58] Field of Search ................. 381/2, 58, 60, 381/59, 22; 364/400.01; 375/242, 224, 225, 228; 704/201; 700/94; 371/30; 324/542, 500, 510, 527; 379/1, 6

[56] References Cited

U.S. PATENT DOCUMENTS

| | | | |
|---|---|---|---|
| 4,016,360 | 4/1977 | Cane | 381/58 |
| 4,110,571 | 8/1978 | Hills | 381/58 |
| 4,700,362 | 10/1987 | Todd et al. | 375/30 |
| 5,155,743 | 10/1992 | Jacobs | 375/28 |
| 5,285,498 | 2/1994 | Johnston | 381/2 |
| 5,644,505 | 7/1997 | Soutar et al. | 381/58 |

OTHER PUBLICATIONS

Copy of International Search Report dated Feb. 19, 1997, from corresponding international application PCT/US97/01573.

*Primary Examiner*—Vivian Chang
*Attorney, Agent, or Firm*—William J. Burke

[57] ABSTRACT

A method and apparatus for creating a plurality of encoded bitstreams that represent selected waveforms in different ways such that when an audio decoder decodes the bitstream, an audible tone or lack thereof, will signify the failure of the audio decoder. The method employs a waveform having a set of baseline parameters but encodes the waveform in different ways by varying the parameter under test. The method monitors the audio decoder's ability to properly decode these alternating waveforms, by listening for an audible tone change or lack thereof. Since the behavior of the selected waveform is predictable, the method provides a set of simple and effective tests for evaluating black box audio decoders which may have no accessible internal nodes.

20 Claims, 11 Drawing Sheets

INDEX

| SB | NBAL | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| SB0 | 4 | - | | 3 | 7 | 15 | 31 | 63 | 127 | 255 | 511 | 1023 | 2047 | 4095 | 8191 | 16383 | 32767 | 65535 |
| SB1 | 4 | - | | 3 | 7 | 15 | 31 | 63 | 127 | 255 | 511 | 1023 | 2047 | 4095 | 8191 | 16383 | 32767 | 65535 |
| SB2 | 4 | - | | 3 | 7 | 15 | 31 | 63 | 127 | 255 | 511 | 1023 | 2047 | 4095 | 8191 | 16383 | 32767 | 65535 |
| SB3 | 4 | - | | 3 | 5 | 7 | 9 | 15 | 31 | 63 | 127 | 255 | 511 | 1023 | 2047 | 4095 | 8191 | 65535 |
| SB4 | 4 | - | | 3 | 5 | 7 | 9 | 15 | 31 | 63 | 127 | 255 | 511 | 1023 | 2047 | 4095 | 8191 | 65535 |
| SB5 | 4 | - | | 3 | 5 | 7 | 9 | 15 | 31 | 63 | 127 | 255 | 511 | 1023 | 2047 | 4095 | 8191 | 65535 |
| SB6 | 4 | - | | 3 | 5 | 7 | 9 | 15 | 31 | 63 | 127 | 255 | 511 | 1023 | 2047 | 4095 | 8191 | 65535 |
| SB7 | 4 | - | | 3 | 5 | 7 | 9 | 15 | 31 | 63 | 127 | 255 | 511 | 1023 | 2047 | 4095 | 8191 | 65535 |
| SB8 | 4 | - | | 3 | 5 | 7 | 9 | 15 | 31 | 63 | 127 | 255 | 511 | 1023 | 2047 | 4095 | 8191 | 65535 |
| SB9 | 4 | - | | 3 | 5 | 7 | 9 | 15 | 31 | 63 | 127 | 255 | 511 | 1023 | 2047 | 4095 | 8191 | 65535 |
| SB10 | 4 | - | | 3 | 5 | 7 | 9 | 15 | 31 | 63 | 127 | 255 | 511 | 1023 | 2047 | 4095 | 8191 | 65535 |
| SB11 | 3 | - | | 3 | 5 | 7 | 9 | 15 | 31 | 65535 |
| SB12 | 3 | - | | 3 | 5 | 7 | 9 | 15 | 31 | 65535 |
| SB13 | 3 | - | | 3 | 5 | 7 | 9 | 15 | 31 | 65535 |
| SB14 | 3 | - | | 3 | 5 | 7 | 9 | 15 | 31 | 65535 |
| SB15 | 3 | - | | 3 | 5 | 7 | 9 | 15 | 31 | 65535 |
| SB16 | 3 | - | | 3 | 5 | 7 | 9 | 15 | 31 | 65535 |
| SB17 | 3 | - | | 3 | 5 | 7 | 9 | 15 | 31 | 65535 |
| SB18 | 3 | - | | 3 | 5 | 7 | 9 | 15 | 31 | 65535 |
| SB19 | 3 | - | | 3 | 5 | 7 | 9 | 15 | 31 | 65535 |
| SB20 | 3 | - | | 3 | 5 | 7 | 9 | 15 | 31 | 65535 |
| SB21 | 3 | - | | 3 | 5 | 7 | 9 | 15 | 31 | 65535 |
| SB22 | 3 | - | | 3 | 5 | 7 | 9 | 15 | 31 | 65535 |
| SB23 | 2 | - | | 3 | 5 | 65535 |
| SB24 | 2 | - | | 3 | 5 | 65535 |
| SB25 | 2 | - | | 3 | 5 | 65535 |
| SB26 | 2 | - | | 3 | 5 | 65535 |
| SB27 | 0 | - |
| SB28 | 0 | - |
| SB29 | 0 | - |
| SB30 | 0 | - |
| SB31 | 0 | - |

SBLIMIT = 27
SUM OF NBAL = 88

*TABLE 1*

TABLE 2

| NUMBER OF STEPS | C | D | GROUPING | SAMPLES PER CODEWORD | BITS PER CODEWORD |
|---|---|---|---|---|---|
| 3 | 1.333333333333 | 0.500000000000 | YES | 3 | 5 |
| 5 | 1.600000000000 | 0.500000000000 | YES | 3 | 7 |
| 7 | 1.142857142857 | 0.250000000000 | NO | 1 | 3 |
| 9 | 1.777777777777 | 0.500000000000 | YES | 3 | 10 |
| 15 | 1.066666666666 | 0.125000000000 | NO | 1 | 4 |
| 31 | 1.032258064452 | 0.062500000000 | NO | 1 | 5 |
| 63 | 1.015873015873 | 0.031250000000 | NO | 1 | 6 |
| 127 | 1.007874015748 | 0.015625000000 | NO | 1 | 7 |
| 255 | 1.003921568627 | 0.007812500000 | NO | 1 | 8 |
| 511 | 1.001956947162 | 0.003906250000 | NO | 1 | 9 |
| 1023 | 1.000977517107 | 0.001953125000 | NO | 1 | 10 |
| 2047 | 1.000488519785 | 0.000976562500 | NO | 1 | 11 |
| 4095 | 1.000244200244 | 0.000488281250 | NO | 1 | 12 |
| 8191 | 1.000122085220 | 0.000244140630 | NO | 1 | 13 |
| 16383 | 1.000061038880 | 0.000122070310 | NO | 1 | 14 |
| 32767 | 1.000030518510 | 0.000061035160 | NO | 1 | 15 |
| 65535 | 1.000015259020 | 0.000030517580 | NO | 1 | 16 |

| INDEX | SCALEFACTOR | INDEX | SCALEFACTOR |
|---|---|---|---|
| 0 | 2.00000000000000 | 32 | 0.00123039165029 |
| 1 | 1.58740105196820 | 33 | 0.00097656250000 |
| 2 | 1.25992104989487 | 34 | 0.00077509816991 |
| 3 | 1.00000000000000 | 35 | 0.00061519582514 |
| 4 | 0.79370052598410 | 36 | 0.00048828125000 |
| 5 | 0.62996052494744 | 37 | 0.00038754908495 |
| 6 | 0.50000000000000 | 38 | 0.00030759791257 |
| 7 | 0.39685026299205 | 39 | 0.00024414062500 |
| 8 | 0.31498026247372 | 40 | 0.00019377454248 |
| 9 | 0.25000000000000 | 41 | 0.00015379895629 |
| 10 | 0.19842513149602 | 42 | 0.00012207031250 |
| 11 | 0.15749013123686 | 43 | 0.00009688727124 |
| 12 | 0.12500000000000 | 44 | 0.00007689947814 |
| 13 | 0.09921256574801 | 45 | 0.00006103515625 |
| 14 | 0.07874506561843 | 46 | 0.00004844363562 |
| 15 | 0.06250000000000 | 47 | 0.00003844973907 |
| 16 | 0.04960628287401 | 48 | 0.00003051757813 |
| 17 | 0.03937253280921 | 49 | 0.00002422181781 |
| 18 | 0.03125000000000 | 50 | 0.00001922486954 |
| 19 | 0.02480314143700 | 51 | 0.00001525878906 |
| 20 | 0.01968626640461 | 52 | 0.00001211090890 |
| 21 | 0.01562500000000 | 53 | 0.00000961243477 |
| 22 | 0.01240157071850 | 54 | 0.00000762939453 |
| 23 | 0.00984313320230 | 55 | 0.00000605545445 |
| 24 | 0.00781250000000 | 56 | 0.00000480621738 |
| 25 | 0.00620078535925 | 57 | 0.00000381469727 |
| 26 | 0.00492156660115 | 58 | 0.00000302772723 |
| 27 | 0.00390625000000 | 59 | 0.00000240310869 |
| 28 | 0.00310039267963 | 60 | 0.00000190734863 |
| 29 | 0.00246078330058 | 61 | 0.00000151386361 |
| 30 | 0.00195312500000 | 62 | 0.00000120155435 |
| 31 | 0.00155019633981 | | |

*TABLE 3*

METHOD AND APPARATUS FOR EVALUATING AN AUDIO DECODER

This application claims the benefit of U.S. Provisional Application No. 60/010,434 filed Jan. 23, 1996.

The present invention relates to a method and apparatus for evaluating the decoding of audio signals. More particularly, this invention relates to a "non-invasive" method and apparatus that evaluates the performance of a "black box" audio decoder by observing the response of the decoder to a predefined series of input signals.

BACKGROUND OF THE INVENTION

The increasing development of digital video/audio technology presents an ever increasing problem of reducing the high cost of compression codecs and resolving the interoperability of equipment of different manufacturers. To achieve these goals, the Moving Picture Experts Group (MPEG) created the ISOIEC international Standards 11172 et seq. (1994) (generally referred to as MPEG-1) and 13818 et seq. (Jan. 20, 1995 draft) (generally referred to as MPEG-2), which are incorporated herein in their entirety by reference. One goal of these standards is to establish a standard coding/decoding strategy with sufficient flexibility to accommodate a plurality of different applications and services such as desktop video publishing, video conferencing, digital storage media and television broadcast.

Although the MPEG standards specify a general coding methodology and syntax for generating a MPEG compliant bitstream, many variations are permitted in the values assigned to many of the parameters, thereby supporting a broad range of applications and interoperability. In effect, MPEG does not define a specific algorithm needed to produce a valid bitstream. Furthermore, MPEG encoder designers are accorded great flexibility in developing and implementing their own MPEG-specific algorithms. This flexibility fosters development and implementation of different MPEG-specific algorithms, thereby resulting in product differentiation in the marketplace.

Digital decoders (such as MPEG audio decoders) present a difficult testing problem when compared to analog systems. An analog system has minimal or no memory and is generally linear, such that the system's behavior is instantaneous. Thus, the behavior of an analog system can be extrapolated from one signal range to another.

In contrast, digital decoders are highly non-linear and often contain memory. A digital decoder may operate normally over a certain range of a certain parameter, but may fail dramatically for certain other values. In essence, the behavior of a digital decoder cannot be extrapolated from one signal range to another.

Generally, the testing of complex digital systems such as decoders is performed by stimulating the decoder under test with a known sequence of data, and then analyzing the output data sequences or the intermediate data sequences using, e.g., a logic analyzer, to determine if the results conform to expectations. Although this is an effective testing technique, it requires extensive knowledge of the circuit implementation or observation of internal nodes of the particular decoder.

However, in many instances the decoder is a "black-box" that accepts a bitstream (encoded signal) as input and provides a digital or analog representation of the decoded signal as an output. Due to product differentiation in the marketplace, it may not be possible to acquire such technical information for all decoders. In fact, even if such technical information is available, it may not be cost effective to construct a different test sequence for every decoder.

Therefore, a need exists in the art for a method and apparatus for testing MPEG-like decoders without prior knowledge of the particular circuit implementation of any particular decoder. Specifically, a need exists for a method and apparatus for creating a test sequence or bitstream that will produce audibly detectable errors in the audio signal produced by an audio decoder if the decoder does not properly decode the bitstream.

SUMMARY OF THE INVENTION

The present invention is a method and apparatus for creating a plurality of encoded bitstreams that represent selected waveforms in different ways such that when an audio decoder decodes the bitstream, an audible tone or lack thereof, will signify the failure of the audio decoder. In general, the method employs a waveform having a set of baseline parameters but encodes the waveform in different ways by varying the parameter under test. The method monitors the audio decoder's ability to properly decode these alternating waveforms, by listening for an audible tone change or lack thereof. Since the behavior of the selected waveform is predictable, the method provides a set of simple and effective tests for evaluating black box audio decoders which may have no accessible internal nodes.

First, the method encodes a simple sinewave having a set of baseline parameters. The resulting bitstream is sent to the decoder which produces an audible tone. The audible tone serves as a gauge to measure the performance of the audio decoder without having to use complex equipment such as an oscilloscope or other meters. The audible tone verifies that the audio decoder is able to perform basic functions such as recognizing the bitstream as an audio bitstream.

Second, the method encodes a signal of a single frequency having a tone with a predefined peak amplitude. The resulting bitstream is encoded using a set of scalefactors such that the overall net level of the signal is kept at a constant. A constant non-varying tone verifies that the audio decoder is functioning properly as to its scalefactors table.

Third, the method encodes a signal by altering the "scfsi" parameter between periods of silence. A number of distinct scalefactor values are used in the encoding. The scalefactors and amplitudes are chosen such that the overall net level of the signal is kept at a constant. A constant tone verifies that the audio decoder is properly applying different scalefactors to different parts of an audio frame.

Fourth, the method encodes a signal with alternating quantizations. The values of the different quantizations are selected such that the same waveform is maintained. Thus, a constant non-varying tone verifies that the audio decoder is properly applying the quantization parameter.

Fifth, the method encodes a signal with alternating stereo modes. Again, the same waveform is maintained for all the different modes. A constant non-varying tone verifies that the audio decoder is properly applying the stereo mode parameter.

Sixth, the method encodes two waveforms of equal amplitude and opposite phase which are sent to opposite channels. A silence verifies that the audio decoder is properly matching the left and right outputs.

Seventh, the method encodes a signal with alternating sample rates. Again, the same waveform is maintained for all the different sample rates. A constant non-varying tone verifies that the audio decoder is properly applying the sample rate parameter.

Eighth, the method encodes a signal with alternating pre-emphasis. Again, the same waveform is maintained for all the different sample rates. A constant non-varying tone verifies that the audio decoder is properly applying the pre-emphasis parameter.

Finally, the method encodes a signal with a valid CRC-check word followed by another encoding of the same signal with an invalid CRC-check word. A constant tone followed by silence verifies that the audio decoder is properly applying the CRC-check parameter.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
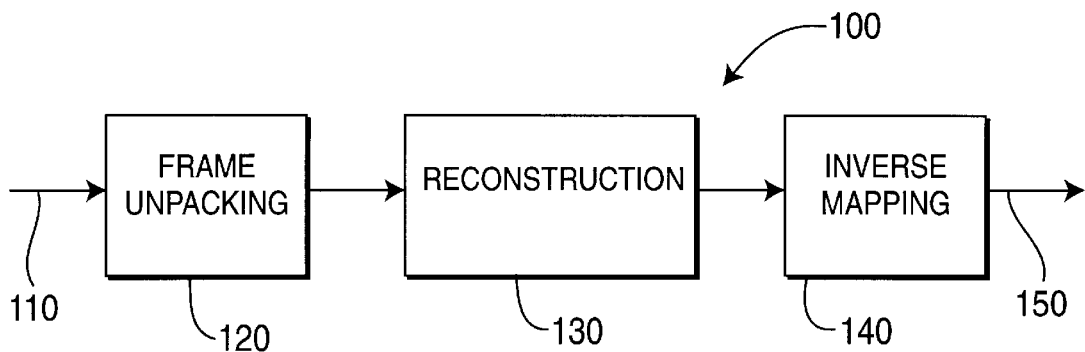
FIG. 1 illustrates a block diagram of the basic structure of a conventional audio decoder.

FIG. 1 depicts a block diagram of the basic structure of a conventional audio decoder for receiving a compressed audio bitstream on path 110. The audio decoder comprises a frame unpacking module 120, a reconstruction module and an inverse mapping module 140. The audio decoder accepts the compressed audio bitstream on path and decodes the various data elements which are used to produce a digital audio output on path 150.

Specifically, the compressed audio stream is received into the frame unpacking module 120. The compressed bitstream is unpacked to recover various data elements or parameters such as header, error-checking, audio data and ancillary data which are contained within an audio frame. An audio frame is a part of an audio signal that corresponds to a fixed number of audio pulse code modulation (PCM) samples. Typically, an audio frame comprises audio PCM samples for each subband. A subband is a subdivision of the audio frequency band, where the audio input is typically mapped into 32 subbands.

Once the data elements or parameters are unpacked, the reconstruction module reconstructs the quantized version of the set of mapped samples. Mapped samples are generated from the process of audio mapping which converts an audio signal from time to frequency domain by subband filtering and/or by modified discrete cosine transform (MDCT). To reverse the mapping process, the inverse mapping module 140 transforms these mapped samples back into uniform PCM.

In order to devise a set of comprehensive test methods for evaluating an audio decoder, it is necessary to evaluate the steps of the audio decoding process. The MPEG standards specify a coding hierarchy having three layers (I, II and III). These coding layers contain different algorithms with increasing complexity and performance. A MPEG audio layer "n" decoder is able to decode bitstream data which has been encoded in layer n and all layers below n. Although the present invention is described below with reference to the MPEG standards, those skilled in the art will realize that the present invention can be applied (with or without modifications) to audio decoders in compliance with other standards.

Figure 2:
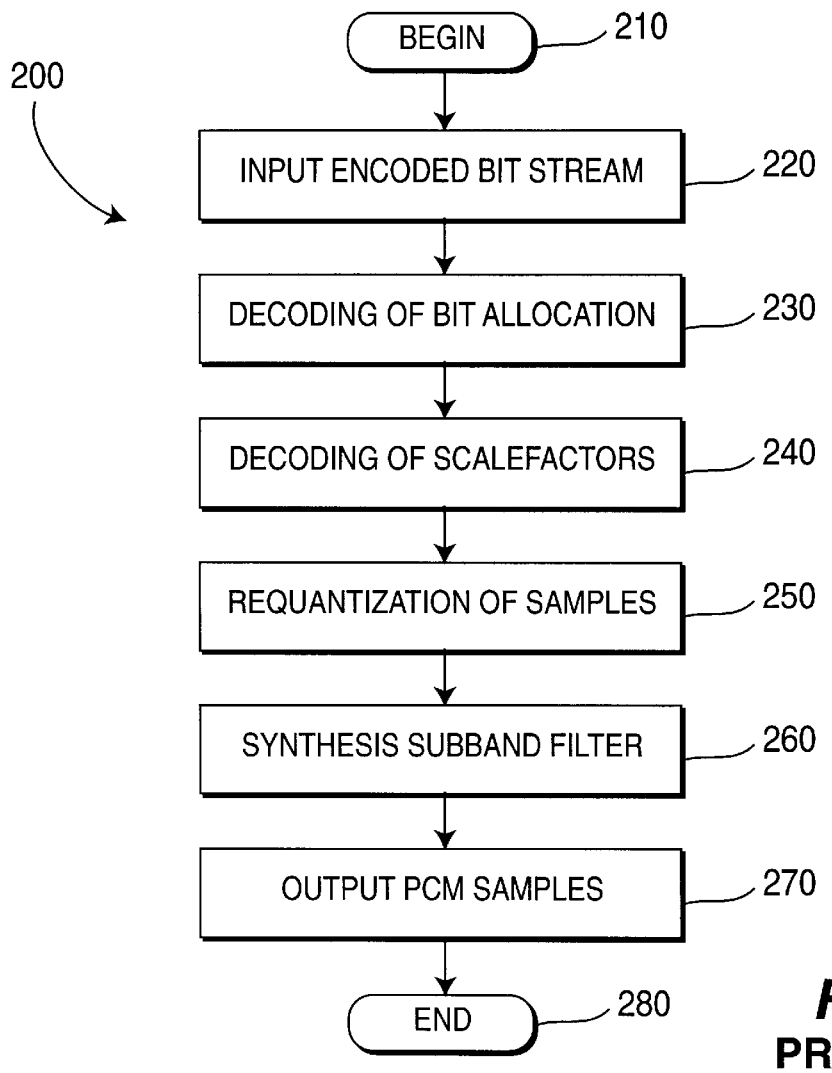
FIG. 2 illustrates a flowchart for the audio decoding method of layer II in accordance with the MPEG standards.

FIG. 2 illustrates the audio decoding method 200 of layer II which incorporates all the basic functions of Layer I and provides additional coding of parameters such as bit allocation, scalefactors and samples. The method begins at step 210 and proceeds to step 220 where the encoded bitstream is received into the audio decoder.

Step 220 consists of recognizing the encoded bitstream as an audio bitstream with a particular layer and decoding the header information. The audio decoder is synchronized with the incoming bitstream by searching for a 12-bit syncword. An "ID" field follows the syncword and indicates a MPEG audio bitstream when a "1" is set in this field. A 2-bit "layer" field follows the ID field and identifies the encoding layer of the audio bitstream. Step 220 further includes the proper decoding of the sample frequency, the stereo mode, emphasis and error check (CRC-check). The sample frequency field is a 2-bit field that indicates the sampling frequencies of 32 kHz, 44.1 kHz or 48 kHz. The stereo mode field is a 2-bit field that indicates the modes of stereo, joint_stereo (intensity stereo), dual_channel or single_channel. The emphasis field is a 2-bit field that indicates the type of de-emphasis that shall be used such as no emphasis, 50/15 microsec. emphasis or CCITT J.17. Finally, a one bit protection field indicates whether a 16-bit CRC-check word has been inserted in the bitstream for detecting transmission error. Once synchronization and the decoding of the above information are completed, the audio decoding method 200 proceeds to step 230.

In step 230, the bit allocation information is decoded for all subbands. Bit allocation is a process performed by an encoder for allocating and adjusting the bits assigned to each sample of a frequency subband such that the target bitrate and masking requirements are satisfied. The principle used in the allocation procedure is to minimize the total noise-to-mask ratio over the frame with the constraint that the number of bits used does not exceed the number of bits available for that frame. Generally, the encoder attempts to spend bits in a manner that is psychoacoustically inoffensive if the encoder cannot meet the psychoacoustic demand at the required bitrate.

The decoding of the bit allocation informs the decoder as to how many bits to allocate to each sample of each frequency subband. The decoding of the bit allocation table is accomplished in a three-step approach. The first step consists of reading "nbal" (2, 3 or 4) bits of information for one subband from the bitstream. The width of the bit allocation information depends on the sample rate and the data rate. Several large lookup tables specify this information and are illustrated as Table 1 and Table 2. The value "nbal" is illustrated in the second column of Table 1. Tables 1 and 2 are generally known as the bit allocation table and classes of quantization table respectively.

The second step uses the "nbal" value and the subband number (sb) as indices to point to a value in Table 1. This value represents the number of levels "nlevel" used to quantize the samples in the subband.

The third step uses the "nlevel" value and Table 2 to determine the number of bits used to code the quantized samples, the requantization coefficients and whether samples (generally 3 samples) are grouped into a single codeword. If any entry in these tables in the audio decoder is incorrect, the audio bitstream will generally produce an error during decoding. Once decoding of the bit allocation is completed, the audio decoding method 200 proceeds to step 240.

In step 240, scalefactor information is decoded for all subband. The selection of scalefactors is a process performed by an encoder for selecting a set of factors by which a set of values are scaled before quantization. The scalefactors are used to set gains for each of the audio frequency subband. The 36 samples in each subband within a frame are divided into three equal parts of 12 samples. Each part can have a separate scalefactor. The scalefactor selection information, a two-bit field known as "scfsi[sb]", is read from the bitstream and informs the audio decoder as to the number of scalefactors that has to be read from the bitstream. Since the majority of the compression achieved by the audio encoder is through the process of turning off frequencies that contain no signal, scalefactors are only selected for subbands that have a non-zero bit allocation. Thus, the coded scalefactors for every subband with a non-zero bit allocation are read from the bitstream. Each coded scalefactor is a 6-bit value which is interpreted in accordance with Table 3, which is known as the "Layer I, II scalefactors table". Table 3 provides the scalefactors by which the relevant subband samples are multiplied after requantization. Once decoding of the scalefactors is completed, the audio decoding method 200 proceeds to step 250.

In step 250, the audio decoder reads and requantizes the coded samples of the audio data. The coded samples typically appear as triplets, i.e., the code contains three consecutive samples at a time. Using Table 2, the audio decoder is able to determine the number of bits to read from the bitstream for each triplet and to derive the three consecutive separable codes for each sample. However, the MPEG standards also permit the triplets to be combined into a single "sampleword" in a process called grouping. In order to degroup the sampleword, the following algorithm is used to separate the three codes s[0], s[1] and s[2]:

$$s[i]=c\%\text{nlevels}; c=c\text{DIV nlevels for}(I=0;I<3;I++) \quad (1)$$

where nlevels is the number of steps as shown in Table 1 and c is the combined code. The meaning of the operators is as defined in ISO/IEC international Standard 11172-3. Once the codes are separated, they are converted into fractions by inverting the first bit of each of the three codes. The resulting numbers are regarded as two's complement fractional numbers, where the most significant bit (MSB) represents the value −1. The requantized values are obtained by applying the formula:

$$s'''=C*(s'''+D) \quad (2)$$

where s''' is the fractional number, s'' is the requantized value and C and D are given in Table 2. The requantized values are then rescaled by multiplying the decoded scalefactors derived from step 240 with the dequantized value s''. Once requantization is completed, the audio decoding method 200 proceeds to step 260.

In step 260, the synthesis subband filter recombines all the subband samples. Once the subband samples for all 32 subbands of one channel have been calculated, they are applied to the synthesis subband filter and 32 consecutive audio samples are calculated. Since there are 32 subbands with each having samples per frame, a total of 1152 audio samples are produced for each frame after filtering. Finally, the audio samples are generated in step 270 and the method ends in step 280.

Figure 12:
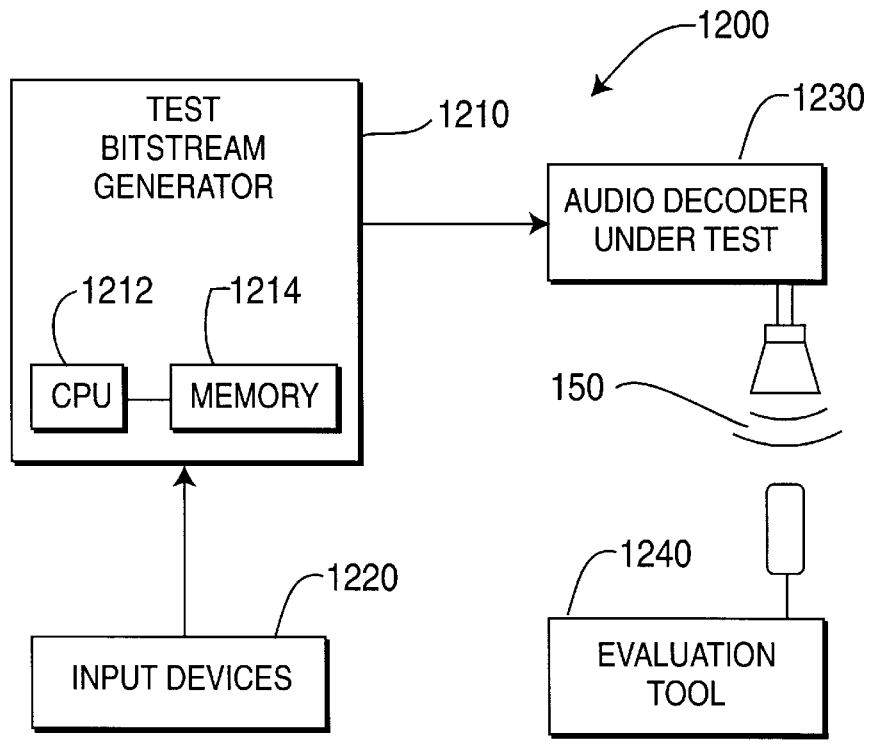
FIG. 12 illustrates a test apparatus of the present invention.

FIG. 12 illustrates a test apparatus 1200 of the present invention. The test apparatus comprises a test bitstream generator 1210 and an evaluation tool 1240. In the preferred embodiment, the test bitstream generator comprises a general purpose computer having a central processing unit (CPU) 1212 and a memory 1214 for generating a plurality of encoded audio bitstreams for evaluating an audio decoder under test 1230. The audio decoder under test can be a physical audio decoder device which is coupled to the test bitstream generator through a communication system such as a transmission channel. Alternatively, the audio decoder under test can be represented by an algorithm residing in the memory of the test bitstream generator.

The test bitstream generator 1210 is coupled to a plurality of input devices 1220 such as a keyboard, a mouse or storage devices, including but not limited to, a hard disk drive or a compact disk drive. The input devices serve to provide inputs to the test bitstream generator for producing the encoded audio bitstreams or to retrieve the encoded audio bitstreams from a storage device (not shown). The operator of the test apparatus sends an encoded audio bitstream to audio decoder 1230 which, in turn, generates an audio output 150. Depending upon the test, the audio output may comprise a plurality of different auditory signs or signals such as a constant tone, a varying tone or lack of a tone (a period of silence). The auditory signs are received by the evaluation tool 1240 to gauge the performance of the audio decoder under test. In the preferred embodiment, the evaluation tool is simply a listener. Alternatively, the evaluation tool is directly coupled to the audio decoder under test and may include an oscilloscope, various meters or a logic analyzer.

Figure 3:
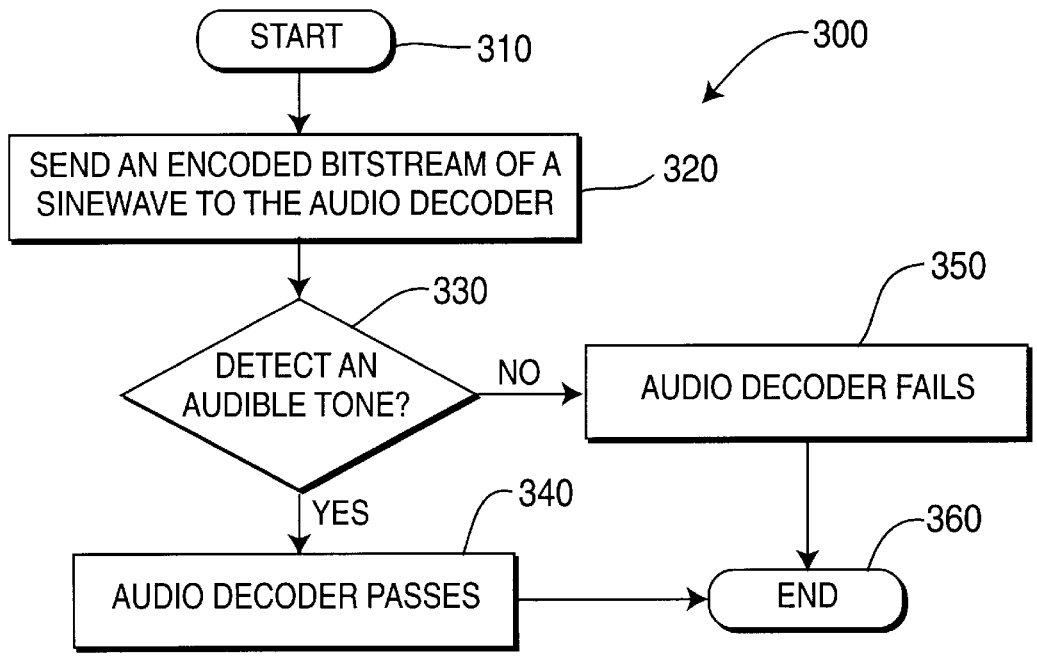
FIG. 3 illustrates a flowchart of a baseline test method for an audio decoder.

FIG. 3 illustrates a baseline test method 300 of the present invention for an audio decoder. Method 300 checks the audio decoder's ability to correctly decode the basic information stored within the header of an audio bitstream.

Referring to FIG. 3, the method 300 begins at step 310 and proceeds to step 320 where an encoded bitstream is sent to the audio decoder that is being tested. The encoded waveform comprises a sinewave represented at a single scalefactor with a single frequency of either 440 Hz or 1 kHz using 65535 levels to quantize the samples in the subbands. The encoded bitstream requires minimal header decoding and is used to test the audio decoder's ability to decode basic header information. The header information includes one layer (layer II), one bitrate of 32 kBits/sec, one sampling frequency of 32 kHz, one mode (single channel), no de-emphasis and no CRC-check.

To maintain the simplicity of this baseline test, the encoded bitstream exercises only two values in the bit allocation table (Table 1). Thus, only one or two subbands will have the full 16-bit resolution, while all other subbands will have zero. The single scalefactor requirement results in assigning the same scalefactor for all subbands, thereby exercising only one entry in the scfsi table (Table 3). Once the encoded bitstream is sent to the audio decoder, the method 300 proceeds to step 330.

In step 330, the method determines whether the audio encoder has correctly decoded the bitstream by listening for an audible tone. If the decision is affirmatively answered, method 300 proceeds to step 340 where the audio decoder is deemed to have passed the test and the method ends in step 360. If the decision is negatively answered, the method 300 proceeds to step 350 where the audio decoder is deemed to have failed the test and the method ends in step 360. Method 300 provides an effective and fast test for determining the basic decoding ability of a black box audio decoder.

Figure 4:
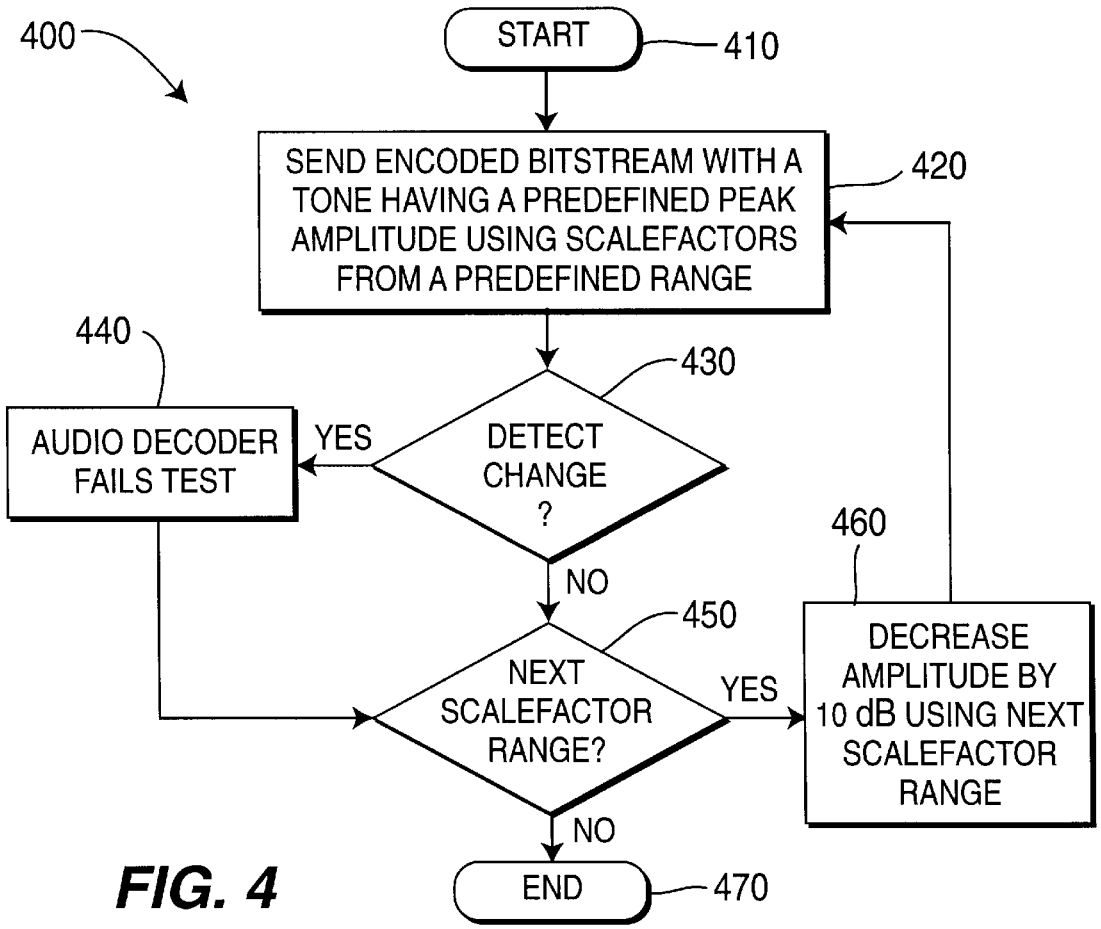
FIG. 4 illustrates a flowchart of a scalefactor test method for an audio decoder.

FIG. 4 illustrates a scalefactor test method 400 for an audio decoder. Method 400 checks the entries in the scalefactor table (Table 3) of the audio decoder and its ability to correctly decode the scalefactor information stored within the audio bitstream.

Referring to FIG. 4, the method 400 begins at step 410 and proceeds to step 420 where an encoded bitstream is sent to the audio decoder. The encoded bitstream contains a signal of a single frequency having a tone with a predefined peak amplitude. In the preferred embodiment, the first tone has a 0.1 peak amplitude as measured out of the analysis filter bank.

The signal is sent using scalefactors from 2.0 to 0.250 which correspond to indices 0 through 9 as shown in Table 3. The overall net level of the signal is kept at a constant by varying the scalefactors and the amplitude of the digital sample values of the signal in accordance with the following formula:

$$\text{(amplitude-of-sample-values)} * \text{(scalefactor)} = \text{(constant)} \quad (3)$$

The constant will be the predefined peak amplitude. Thus, as the scalefactors decrease, the amplitude of the sample values will increase to maintain the predefined peak amplitude of the signal. In step 420, the scalefactors in the encoded bitstream can be changed about five times per second, using only two different scalefactors per second. For a range of ten scalefactors, the test should emit a tone for five seconds.

In step 430, the method determines whether the audio decoder has correctly decoded the bitstream and applied the correct scalefactors by listening for the 5 Hz changes in the audible tone. If the decision is positively answered, method 400 proceeds to step 440 where the audio decoder is deemed to have failed the test for the selected scalefactor range and peak amplitude. If the decision is negatively answered, the audio decoder passes the test for the current selected scalefactor range and the method 400 proceeds to step 450.

In step 450, the method determines whether additional scalefactor ranges remain to be tested in the audio decoder. If the decision is affirmatively answered, method 400 proceeds to step 460 where the test continues with other tone amplitudes. If the decision is negatively answered, method 400 proceeds to step 470 and the test ends.

In step 460, the predefined peak level is decreased by dB using the next scalefactor range. There are 63 possible tone amplitudes corresponding to the 63 available scalefactors. To provide a comprehensive test, the scalefactor ranges are overlapped. For example, the next scalefactor range contains scalefactor indices 5–14. In this manner, the method exercises all the entries in the scalefactors table with different amplitudes. Finally, the method returns to step 420 where an encoded bitstream with the new peak amplitude and scalefactor range is sent to the audio decoder. The detection of the 5 Hz change is again used to gauge the performance of the audio decoder. Method 400 continues until all the scalefactor ranges are completely tested.

Method 400 provides an effective test of the accuracy of the scalefactors table of a black box audio decoder. Furthermore, as the peak amplitude decreases, the audio decoder will likely begin to exhibit quantization noise, electrical hum or other distortions at the last few amplitudes which are very small. Many audio decoders lack the resolution to properly maintain these low amplitudes. Thus, this test also provides a rough measure of the quality of the analog output circuit of the audio decoder.

Finally, those skilled in the art will realize that method 400 is not required to send encoded bitstreams repeatedly to the audio decoder. It is possible to construct a single encoded bitstream with all the steps running sequentially with or without pauses, i.e., a period of silence between scalefactor ranges.

Figure 5:
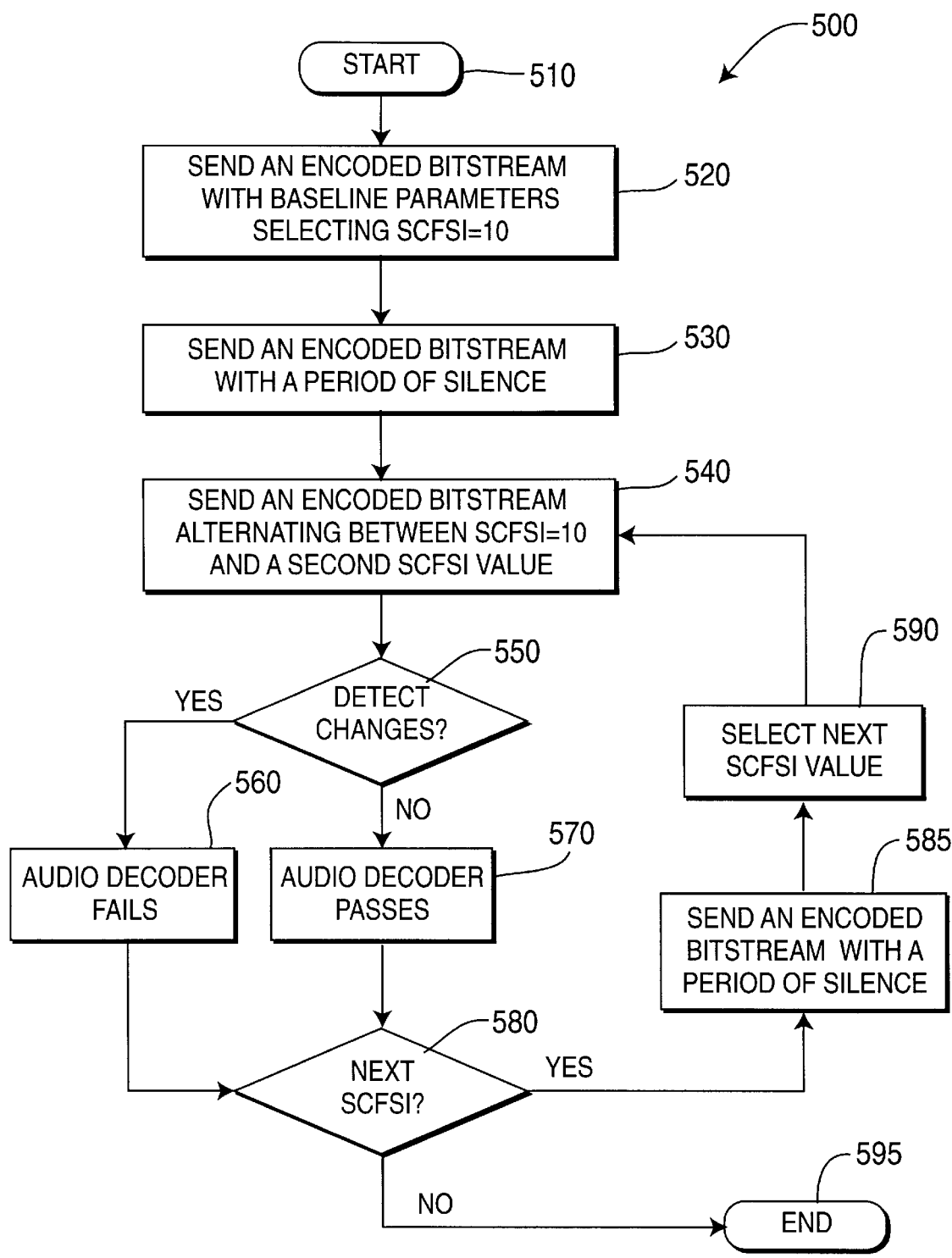
FIG. 5 illustrates a flowchart of a SCFSI test method for an audio decoder.

FIG. 5 illustrates a SCFSI test method 500 for an audio decoder. Method 500 checks the audio decoder's ability to correctly decode and apply different scalefactors to different parts of an audio frame. As discussed above, the 36 samples in each subband within a frame are divided into three equal parts (0, 1 and 2) of 12 samples. Each part can have a separate scalefactor. A two-bit field, "scfsi[sb]", informs the audio decoder as to the number of scalefactors that has to be read from the bitstream. The scfsi values "00", "01", "10" and "11" correspond to three scalefactors transmitted, two scalefactors transmitted (one for parts 0 and 1, and second for part 2), one scalefactor transmitted and two scalefactors transmitted (one for part 0, and second for parts 1 and 2) respectively.

Referring to FIG. 5, the method 500 begins at step 510 and proceeds to step 520 where an encoded bitstream is sent to the audio decoder. The encoded bitstream contains an initial signal with baseline parameters as discussed in method 300 above with a scfsi value of "10" and a single peak amplitude. Thus, the initial signal in step 520 is applied with a single scalefactor for a fixed duration such as approximately one second. The audio decoder should decode the initial signal and produce a constant tone.

In step 530, an encoded bitstream containing a period of silence is sent to the audio decoder. This silence demarcates the pending changes in the scfsi values. The duration of silence is set at about 0.012 second in the preferred embodiment.

In step 540, an encoded bitstream is sent to the audio decoder with alternating scfsi values of "10" and "00". The selected scalefactors indices are 0, 6 and 9. Since the selected scalefactors and the amplitudes of the sample values are chosen such that the overall net level (peak amplitude) of the signal is kept at a constant, the audio decoder should produce a constant tone. The fixed duration of this step is approximately one second.

In step 550, the method queries whether the audio encoder has correctly decoded the bitstream and applied the correct scalefactors to the correct parts of the signal by listening for changes in the correct constant tone. If the decision is negatively answered, method 500 proceeds to step 570 where the audio decoder is deemed to have passed the test for the selected scfsi value. If the decision is affirmatively answered, method 500 proceeds to step 560 where the audio decoder is deemed to have failed the test for the current selected scfsi value and the method 500 proceeds to step 580.

In step 580, the method determines whether additional scfsi values remain to be tested in the audio decoder. If the decision is affirmatively answered, method 500 proceeds to step 585 where another period of silence is introduced to demarcate a scfsi value change. If the decision is negatively answered, method 500 proceeds to step 595 and the test ends.

In step 590, the scfsi value is changed and the scalefactors are reduced, if necessary, to the indices of 0 and 9. The method returns to step 540 until all scfsi values are tested.

Method 500 provides an effective test of a black box audio decoder's ability to apply different scalefactors to different parts of an audio frame. If the audio decoder fails this test, the output waveform will have intermittent distortion that comes and goes.

Finally, those skilled in the art will realize that method 500 is not required to send encoded bitstreams repeatedly to the audio decoder. It is possible to construct a single encoded bitstream with all the steps running sequentially with different durations other than one second and 0.012 second.

Figure 6:
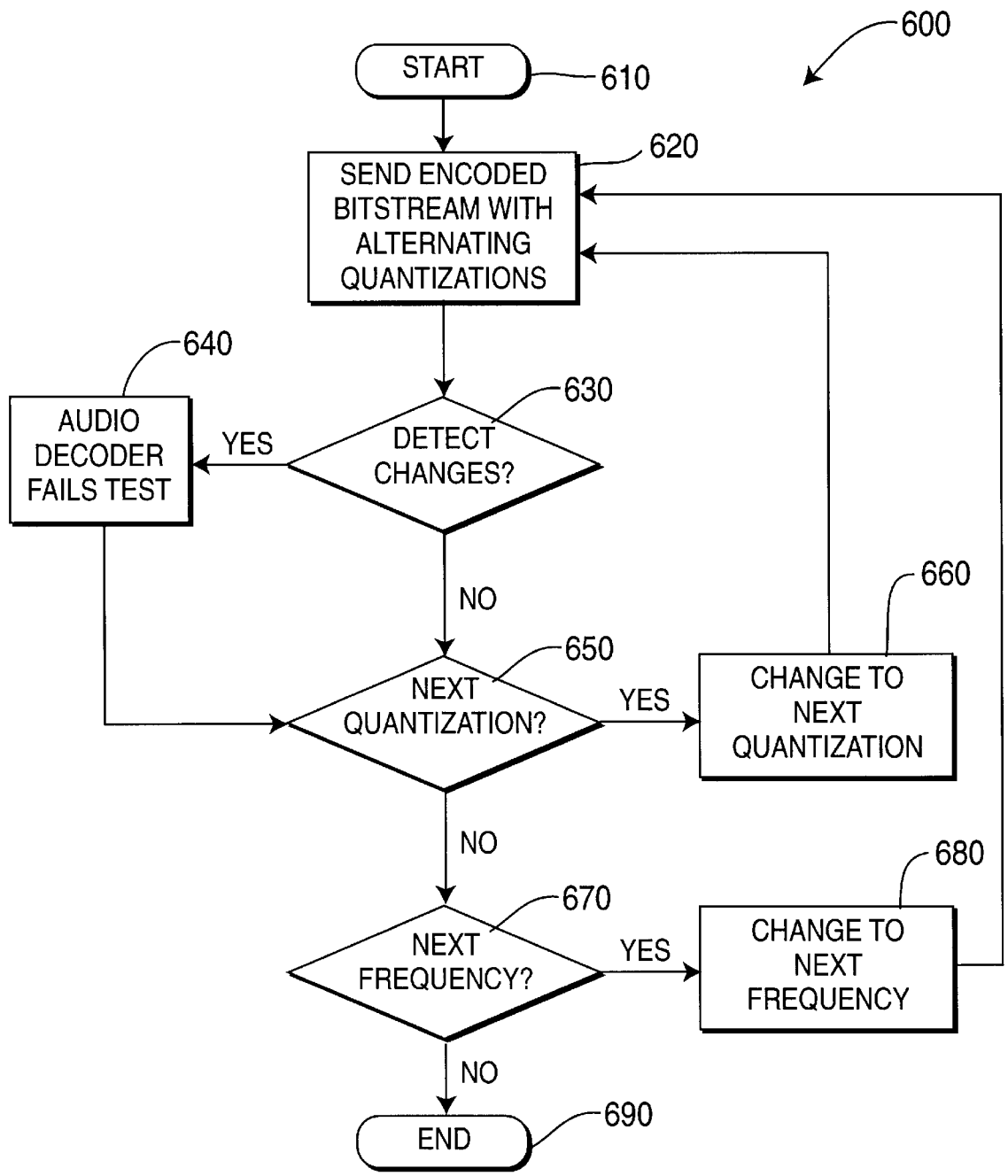
FIG. 6 illustrates a flowchart of a bit allocation test method for an audio decoder.

FIG. 6 illustrates a bit allocation test method 600 for an audio decoder. Method 600 checks the audio decoder's ability to correctly decode the bit allocation information and to apply the proper requantization to the waveform. The method 600 employs two different bit allocation methods to generate the same waveform. The encoder produces an encoded bitstream that alternates between two different levels of quantization with five changes per second.

To illustrates, the first bit allocation method uses coarse quantization such as "3" level encoding. The second bit allocation method uses fine quantization such as "65535" level encoding, but only employs the values which match the "3" level encoding. Thus, a "3" level encoding of a sine wave in fractional 2's complement is 00,01,00,11,00,01, . . . , which correspond to 0, 0.5, 0, –0.5, 0, 0.5, . . . respectively. The corresponding "65535" level encoding of a sine wave in fractional 2's complement is 0000000000000000(0), 0100000000000000(0.5), 0000000000000000(0), 1100000000000000(–0.5), . . . . Thus, the two waveforms will produce identical outputs such that the 5 Hz change will be transparent to a listener if the audio decoder performs properly. In the preferred embodiment, the "65535" level is used as a reference to test the other 16 quantization levels (3, 5, 7, 9, 15, 31, 63, 127, 255, 511, 1023, 2047, 4095, 8191, 16383 and 32767) as shown in Table 1.

Referring to FIG. 6, the method 600 begins at step 610 and proceeds to step 620 where an encoded bitstream is sent to the audio decoder. The encoded bitstream contains a very quantized sine wave which alternates between two different levels of quantization, a reference quantization level and a test quantization level.

In step 630, the method determines whether the audio decoder has correctly decoded the bit allocation information and applied the correct quantization level by listening for the 5 Hz change in the audible tone. If the decision is affirmatively answered, method 600 proceeds to step 640 where the audio decoder is deemed to have failed the test for the selected quantization level. If the decision is negatively answered, the audio decoder passes the test for the current selected quantization level and the method 600 proceeds to step 650.

In step 650, the method determines whether additional quantization levels remain to be tested in the audio decoder. If the decision is affirmatively answered, method 600 proceeds to step 660 where the test continues with other quantization levels. If the decision is negatively answered, method 600 proceeds to step 670.

In step 660, the quantization is changed in accordance with Table 1 for the current frequency. The method returns to step 620 and a new encoded bitstream is sent while alternating between the reference quantization level and the newly selected test quantization level.

In step 670, the method determines whether additional frequencies remain to be tested in the audio decoder. If the decision is affirmatively answered, method 600 proceeds to step 680 where the test continues with other frequencies. If the decision is negatively answered, method 600 proceeds to step 690 and ends.

In step 680, a new frequency is selected for the quantized sinewave. Since any given frequency band possesses, at most, quantization levels, it is necessary to test tones of differing frequencies to cover the entire set of available quantization levels. For example, testing tones of frequencies SB0 and SB3 of Table 1 will provide all the available quantization levels. However, testing other combinations of frequencies will also provide the same coverage. Once the new frequency is selected, method 600 returns to step 620 until all the quantization levels are tested. The detection of the 5 Hz change is again used to gauge the performance of the audio decoder.

Method 600 provides an effective test of the accuracy of the bit allocation table of a black box audio decoder and its ability to apply the correct quantization level. Since the quantization is generally coarse, the resulting output waveform should sound like: aaaaaaaaa, eeeeeeeee, ooooooooo, uuuuuuuuu, . . . , where a failure might sound like: AAaaAAaaAAaaAA or aauuaauuaauu. Thus, this test provides a easy measure of the bit allocation and quantization ability of the audio decoder.

Finally, those skilled in the art will realize that method 600 is not required to send encoded bitstreams repeatedly to the audio decoder. It is possible to construct a single encoded bitstream with all the steps running sequentially with or without pauses, i.e., a period of silence between quantization level and tone frequency changes.

Figure 7:
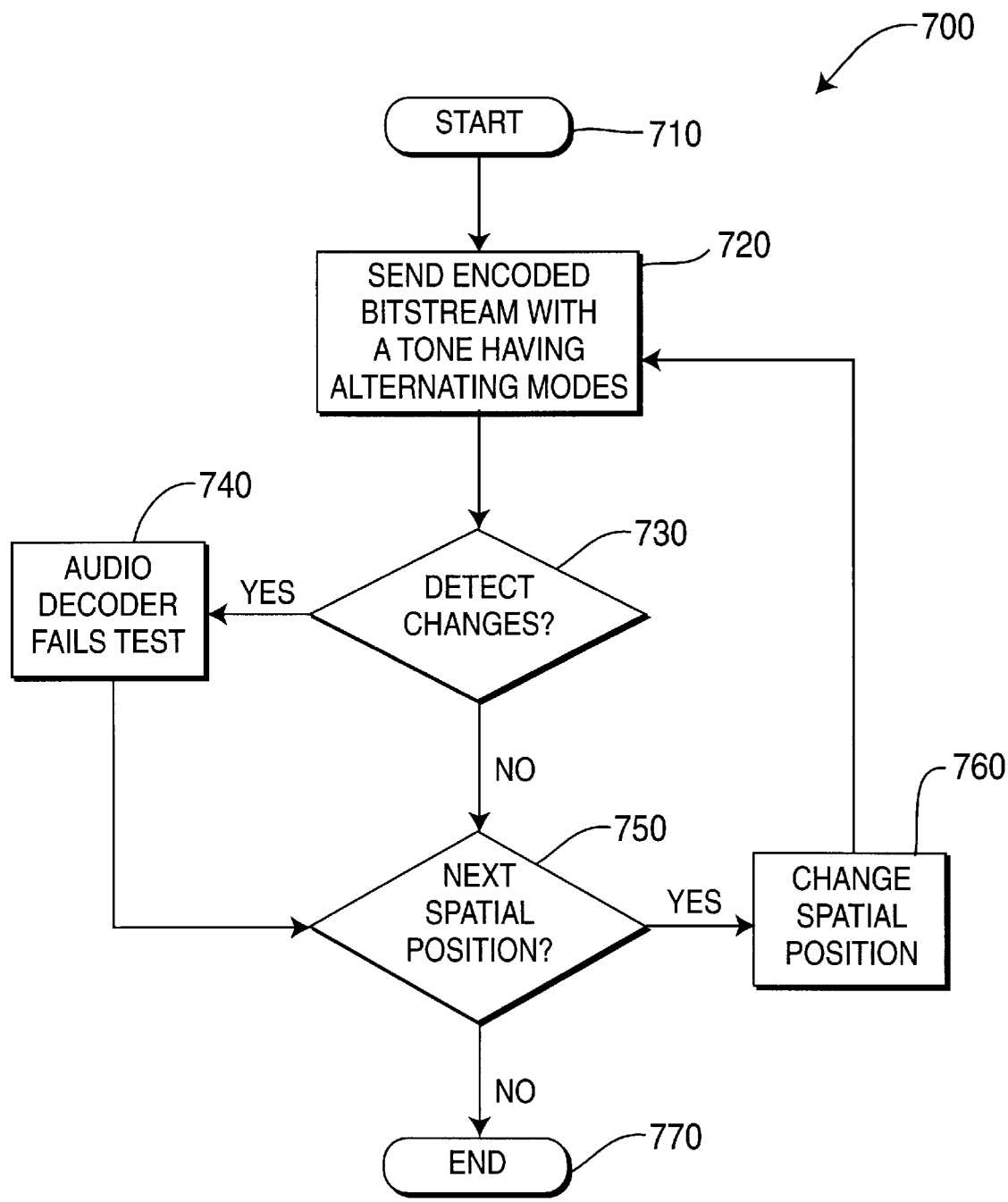
FIG. 7 illustrates a flowchart of a stereo localization test method for an audio decoder.

FIG. 7 illustrates a stereo localization test method 700 for an audio decoder. Method 700 verifies the audio decoder's ability to correctly decode the stereo mode information and to apply the waveform to the correct spatial positions. The method 700 employs three different modes to generate the same waveform. The encoder produces an encoded bitstream that alternates between mono, stereo and intensity stereo with two changes per second. Intensity stereo is a mode that only retains the energy envelope of the right and left channels at high frequencies. The reduced frequency from 5 Hz used in the previous test methods to 2 Hz is to allow the localization to develop. In the preferred embodiment of this test method, a bitrate of 32 kHz is selected.

Referring to FIG. 7, the method 700 begins at step 710 and proceeds to step 720 where an encoded bitstream is sent to the audio decoder. The encoding of the bitstream alternates between three different modes, mono, stereo and intensity stereo, where a tone is directed at various spatial positions in the sound field. These positions include "Center", "Somewhat Left", "Left", "Somewhat Right" and "Right". Since the waveforms generated under each mode of encoding are identical, the resulting sound image from the audio decoder should not produce any noticeable changes for each mode of encoding.

In step 730, the method determines whether the audio decoder has correctly decoded the bitstream and applied the correct mode by listening for the 2 Hz change in the audible tone. If the decision is affirmatively answered, method 700 proceeds to step 740 where the audio decoder is deemed to have failed the test for the selected spatial position. Generally, a failure is indicated when sound image shifts when the mode changes such as a left-right flip-flopping. A second type of failure is where a noticeable click or a moment of silence is observed between mode changes, which can occur on a frame-by-frame basis. A third type of failure is simply the detection of noise instead of the predicted tone due to failed decoding. One common reason for such failure is the lack of support for the selected stereo mode in the audio decoder. Finally, if the decision is negatively answered in step 730, the audio decoder passes the test for the current selected spatial position and the method 700 proceeds to step 750.

In step 750, the method determines whether additional spatial positions remain to be tested in the audio decoder. If the decision is affirmatively answered, method 700 proceeds to step 760 where the test continues with other spatial positions. If the decision is negatively answered, method 700 proceeds to step 770 and the test ends.

In step 760, the spatial position is changed for the encoded bitstream by selecting the next position. Although five spatial positions are disclosed above, additional spatial positions can be tested.

Method 700 provides an effective test of the audio decoder's ability to support different stereo modes. Specifically, method 700 is very useful in verifying the audio decoder's ability to decode and implement the intensity stereo mode, as this mode needs two scalefactors to determine the proper levels for a common sound in the left and right channels. As the number of channels increases such as up to five channels, the audio decoder's ability to properly implement the increasing complexity of the intensity stereo mode can be easily verified by test method 700.

Furthermore, method 700 must use several frequency subbands and "mode_extensions" in the intensity stereo mode. Mode_extension indicates to the audio decoder which subbands are in intensity stereo mode and the "bound" which indicates the lowest subband in which intensity stereo is used. As such, method 700 is able to confirm that lower frequency bands are not sent as intensity stereo. For example, if the lower frequency bands are below the selected bound, then decoding such bands in intensity stereo will produce an error.

Those skilled in the art will realize that method 700 is not required to send encoded bitstreams repeatedly to the audio decoder. It is possible to construct a single encoded bitstream with all the steps running sequentially with or without pauses, i.e., a period of silence between spatial positions.

Figure 8:
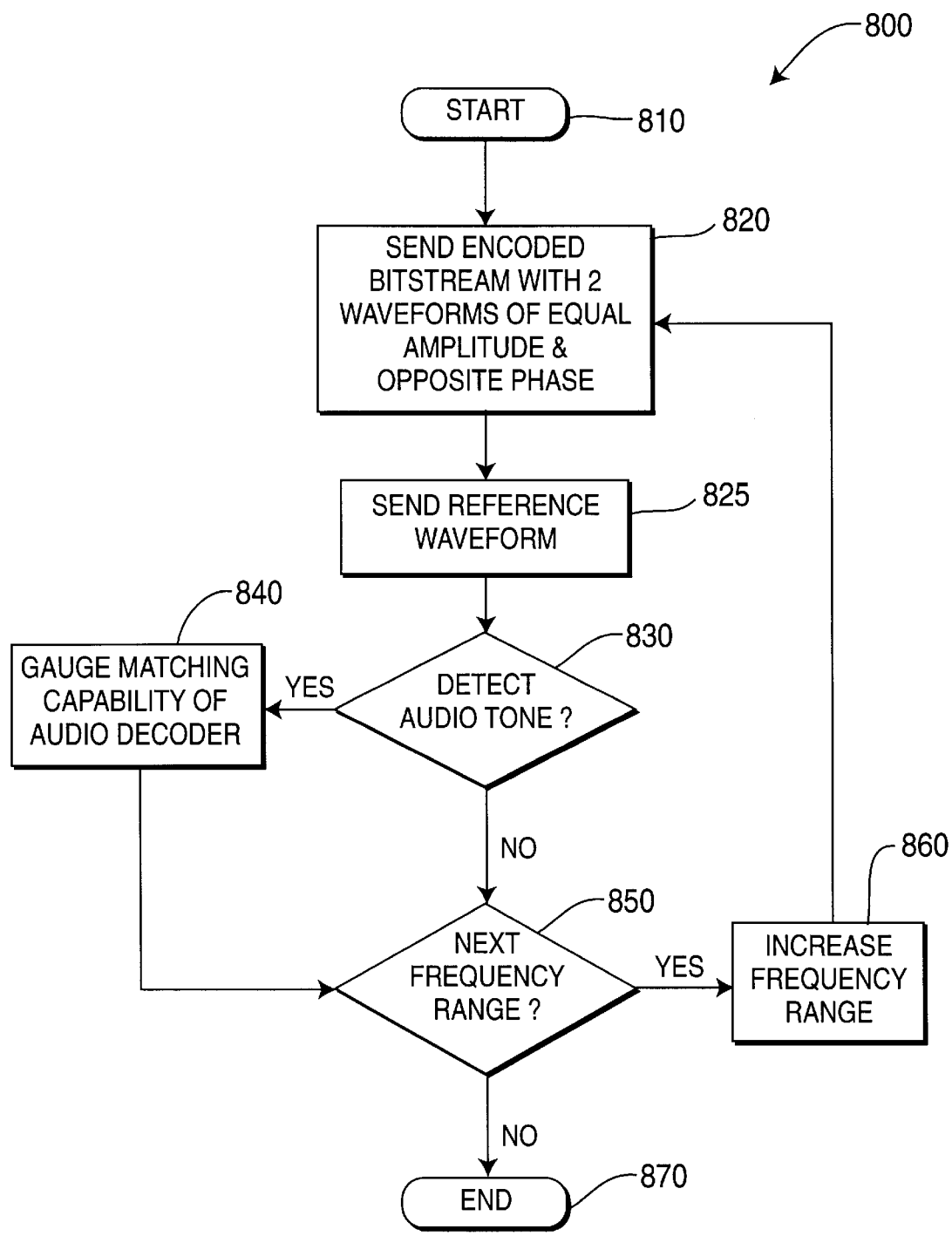
FIG. 8 illustrates a flowchart of an anti-mono test method for an audio decoder.

FIG. 8 illustrates an anti-mono test method 800 for an audio decoder. Method 800 verifies the audio decoder's ability to correctly decode and match the left and right outputs. The method 800 employs two waveforms, one in the left channel and the other in the right channel. The waveforms are of equal amplitude and opposite in phase. If the audio decoder is functioning properly, the combination of the two waveforms (anti-mono signal) should produce a canceling effect. The extent of the cancellation depends on the gain, time delay and frequency response matching of the audio decoder. Furthermore, the listener must use a monophonic combiner (not shown) to add equal amplitudes of the left and right channels. A monophonic combiner can be made with two matched resistors, where each resistor is connected to one analog output source at one end, and both resistors are connected together to the speaker (or other output means) at their other ends.

Referring to FIG. 8, the method 800 begins at step 810 and proceeds to step 820 where an encoded bitstream of two waveforms having equal amplitude but opposite in phase is sent to the audio decoder. The decoder sends one signal to the left channel and the other to the right channel, both at normal full volume.

In step 825, the same waveform (left-only reference signal) with level of −40 dB is sent only to the left channel. Step 825 is an optional step where the left-only reference signal is used to gauge the level of matching of the audio decoder as discussed below in step 840.

In step 830, the method determines whether the audio decoder has correctly matched the left and right outputs by listening for an audible tone. If the decision is affirmatively answered, method 800 proceeds to step 840 where the audio decoder is deemed to have failed the matching test. If the decision is negatively answered in step 830, the audio decoder passes the test for the current selected frequency range and the method 800 proceeds to step 850.

In step 840, the left-only reference signal of step 825 can be employed to estimate the level of matching of the audio decoder. The method 800 compares the anti-mono signal with the left-only reference signal. If the decoder's left and right outputs do not perfectly match, the difference of distortion in the left channel of the anti-mono signal will not be canceled by the right channel of the anti-mono signal. This residual signal or distortion will be compared with the left-only reference signal. This permits method 800 to quantify the extent of the distortion in the mismatch of the left and right outputs. If the decoder is functioning perfectly, the anti-mono signal should not be heard while the left-only reference signal should produce a quiet tone on the left channel. If the audio decoder matches the left and right outputs to within 1%, the anti-mono and left-only reference signals should produce tones of similar amplitudes. If the match is worse than 1%, then the anti-mono signal should be louder than the left-only reference signal. Furthermore, the matching capability of an audio decoder can be quantified without the use of complicated equipment by comparing the loudness of the distortion from the anti-mono signal with reference signals of different levels. Finally, if the frequency responses of the two channels are not correctly matched, the anti-mono signal will likely produce noise at high frequencies. This result implies a mismatch of high frequency roll-off filters or a time delay mismatch on the output of the digital-to-analog converters.

In step 850, the method determines whether additional frequency ranges remain to be tested in the audio decoder. In the preferred embodiment, method 800 evaluates gain/phase matching for the initial frequency range of 0–5 kHz. The limited bandwidth provides a better evaluation of the audio decoder's performance. If the decision is answered in the positive, method 800 proceeds to step 860 where the test continues with other frequency ranges. If the decision is answered in the negative, method 800 proceeds to step 870 and the test ends.

In step 860, the frequency range is increased by increment of 5 kHz such that the gain/frequency matching of frequency ranges of 0–5 kHz, 0–10 kHz, 0–15 kHz and 0–20 kHz are evaluated. Although increment of 5 kHz is disclosed above, other increments can be used.

Method 800 provides an effective test of the audio decoder's ability to match the left and right outputs. Specifically, method 800 provides a simple and effective test for gauging the mismatch in gain, time delay and frequency response by simply comparing a reference tone with the distortion of the anti-mono signal. Finally, those skilled in the art will realize that method 800 is not required to send encoded bitstreams repeatedly to the audio decoder. It is possible to construct a single encoded bitstream with all the steps running sequentially with or without pauses, i.e., a period of silence between frequency ranges or additional reference signals.

Figure 9:
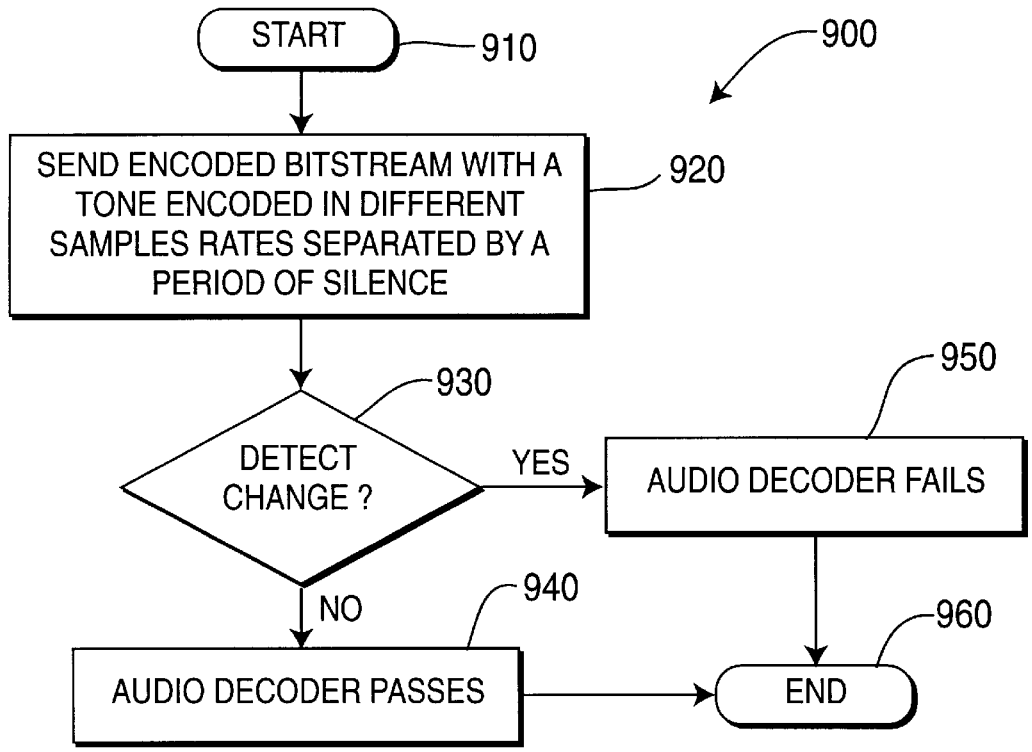
FIG. 9 illustrates a flowchart of a sample rate test method for an audio decoder.

FIG. 9 illustrates a sample rate test method 900 for an audio decoder. Method 900 verifies the decoder's ability to change sample rates.

Referring to FIG. 9, the method 900 begins at step 910 and proceeds to step 920 where an encoded bitstream is sent to the audio decoder. The encoded bitstream contains a signal having a tone at approximately 440 Hz at normal full volume which is initially encoded in the sample rate of 32 kHz. This is followed by a period of silence, then the same signal is encoded in the sample rate of 44.1 kHz. Again, this is followed by another period of silence then the same signal is encoded in the sample rate of 48 kHz. The three selected sample rates are currently supported by MPEG compliant audio decoders. However, this process can be repeated to accommodate any number of different sample rates.

In step 930, the method determines whether the audio decoder has correctly decoded the bitstream and changed the sample rates by listening for changes in the audible tone. The change in sample rates should not alter the pitch, amplitude or the purity of the tone. Thus, if the decision is affirmatively answered, method 900 proceeds to step 950 where the audio decoder is deemed to have failed the test and the method ends in step 960. If the decision is negatively answered, the method 900 proceeds to step 940 where the audio decoder is deemed to have passed the test and the method ends in step 960.

Figure 10:
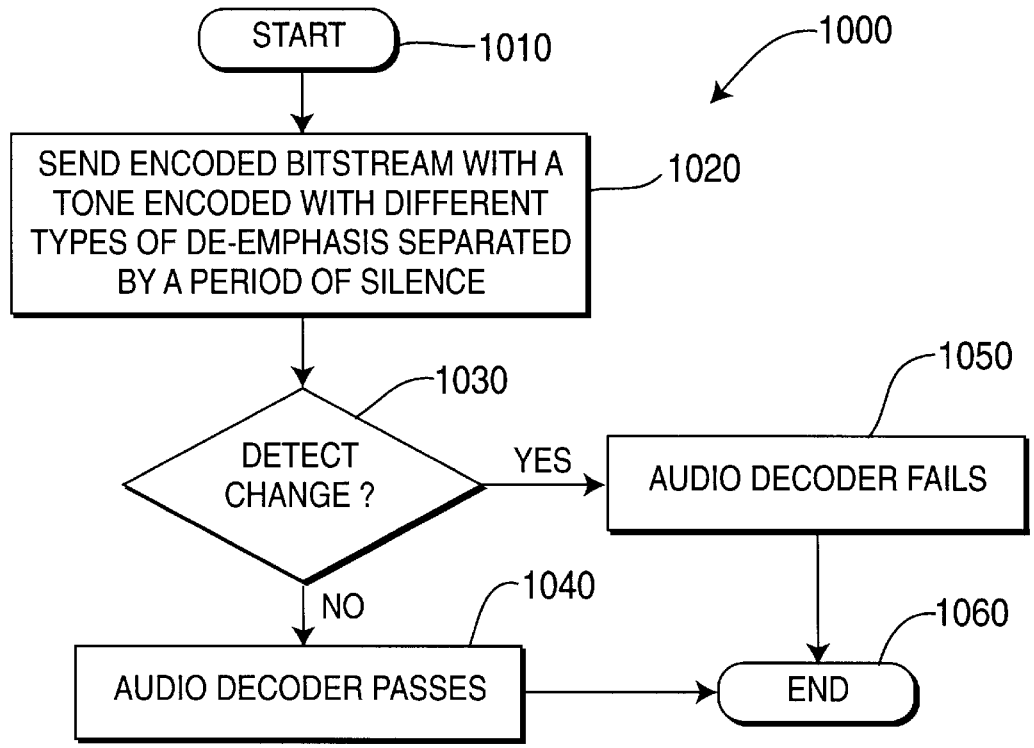
FIG. 10 illustrates a flowchart of an emphasis test method for an audio decoder.

FIG. 10 illustrates an emphasis test method 1000 for an audio decoder. Method 1000 verifies the decoder's ability to apply the correct de-emphasis to the waveform.

Referring to FIG. 10, the method 1000 begins at step 1010 and proceeds to step 1020 where an encoded bitstream is sent to the audio decoder. The encoded bitstream contains a single subband noise waveform which is initially encoded using one of four choices of pre-emphasis. This is followed by a period of silence then the same signal is encoded using another pre-emphasis. This process is repeated until the signal has been encoded using all available types of pre-emphasis and separated by a period of silence. Currently, four types of pre-emphasis are supported by MPEG compliant audio decoders. However, this process can be repeated to accommodate any number of different pre-emphasis types.

In step 1030, the method determines whether the audio encoder has correctly decoded the bitstream and applied the selected pre-emphasis by listening for changes in the audible tone. The change in emphasis should not alter the tone. Thus, if the decision is answered in the positive, method 1000 proceeds to step 1050 where the audio decoder is deemed to have failed the test and the method ends in step 1060. If the decision is answered in the negative, the method 1000 proceeds to step 1040 where the audio decoder is deemed to have passed the test and the method ends in step 1060.

Figure 11:
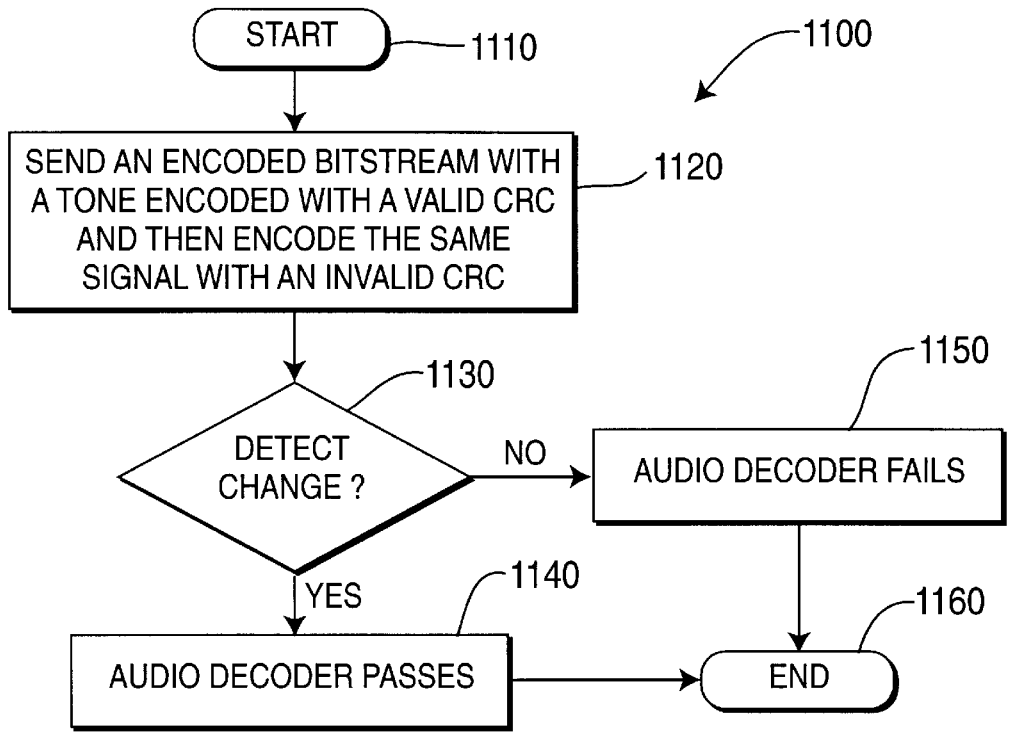
FIG. 11 illustrates a flowchart of a cyclic redundancy code test method for an audio decoder.

FIG. 11 illustrates a cyclic redundancy code (CRC) test method 1100 for an audio decoder. Method 1100 verifies the audio decoder's ability to apply the CRC-check word to detect transmission error. Such CRC-check word is inserted in the bitstream just after the header. The CRC-check word is compared with another word comprising the 16 bits of the header (starting with the bit_rate_index and ending with emphasis) and the number of bits of audio_data (starting with the first bit). If the two words are not identical, then a transmission error has occurred in the protected field of the bitstream. Generally, a good audio decoder will employ a concealment technique that mutes the defective frame to avoid distortions when a transmission error is detected.

Referring to FIG. 11, the method 1100 begins at step 1110 and proceeds to step 1120 where an encoded bitstream is sent to the audio decoder. The encoded bitstream contains a waveform which is encoded with a valid CRC-check word. This is followed by the same encoded bitstream with an invalid CRC-check word.

In step 1130, the method determines whether the audio decoder has correctly decoded the bitstream and applied the CRC-check word by listening for an audible tone followed by a period of silence. The invalid CRC-check word should cause the signal to be muted by the audio decoder. Thus, if the decision is answered in the positive, method 1100 proceeds to step 1140 where the audio decoder is deemed to have passed the test and the method ends in step 1160. If the decision is answered in the negative (the tone is continuous), the method 1100 proceeds to step 1150 where the audio decoder is deemed to have failed the test and the method ends in step 1160.

There has thus been shown and described a novel method for creating a test sequence or bitstream that will produce audibly detectable errors in the audio signal produced by an audio decoder if the decoder does not properly decode the bitstream. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

TABLE 1

| sb | nbal | \multicolumn{16}{c}{index} | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| SB0 | 4 | — | 3 | 7 | 15 | 31 | 63 | 127 | 255 | 511 | 1023 | 2047 | 4095 | 8191 | 16383 | 32767 | 65535 |
| SB1 | 4 | — | 3 | 7 | 15 | 31 | 63 | 127 | 255 | 511 | 1023 | 2047 | 4095 | 8191 | 16383 | 32767 | 65535 |
| SB2 | 4 | — | 3 | 7 | 15 | 31 | 63 | 127 | 255 | 511 | 1023 | 2047 | 4095 | 8191 | 16383 | 32767 | 65535 |
| SB3 | 4 | — | 3 | 5 | 7 | 9 | 15 | 31 | 63 | 127 | 255 | 511 | 1023 | 2047 | 4095 | 8191 | 65535 |
| SB4 | 4 | — | 3 | 5 | 7 | 9 | 15 | 31 | 63 | 127 | 255 | 511 | 1023 | 2047 | 4095 | 8191 | 65535 |
| SB5 | 4 | — | 3 | 5 | 7 | 9 | 15 | 31 | 63 | 127 | 255 | 511 | 1023 | 2047 | 4095 | 8191 | 65535 |
| SB6 | 4 | — | 3 | 5 | 7 | 9 | 15 | 31 | 63 | 127 | 255 | 511 | 1023 | 2047 | 4095 | 8191 | 65535 |
| SB7 | 4 | — | 3 | 5 | 7 | 9 | 15 | 31 | 63 | 127 | 255 | 511 | 1023 | 2047 | 4095 | 8191 | 65535 |
| SB8 | 4 | — | 3 | 5 | 7 | 9 | 15 | 31 | 63 | 127 | 255 | 511 | 1023 | 2047 | 4095 | 8191 | 65535 |
| SB9 | 4 | — | 3 | 5 | 7 | 9 | 15 | 31 | 63 | 127 | 255 | 511 | 1023 | 2047 | 4095 | 8191 | 65535 |
| SB10 | 4 | — | 3 | 5 | 7 | 9 | 15 | 31 | 63 | 127 | 255 | 511 | 1023 | 2047 | 4095 | 8191 | 65535 |
| SB11 | 3 | — | 3 | 5 | 7 | 9 | 15 | 31 | 65535 | | | | | | | | |

TABLE 1-continued

| sb | nbal | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| SB12 | 3 | — | 3 | 5 | 7 | 9 | 15 | 31 | 65535 | | | | | | | | |
| SB13 | 3 | — | 3 | 5 | 7 | 9 | 15 | 31 | 65535 | | | | | | | | |
| SB14 | 3 | — | 3 | 5 | 7 | 9 | 15 | 31 | 65535 | | | | | | | | |
| SB15 | 3 | — | 3 | 5 | 7 | 9 | 15 | 31 | 65535 | | | | | | | | |
| SB16 | 3 | — | 3 | 5 | 7 | 9 | 15 | 31 | 65535 | | | | | | | | |
| SB17 | 3 | — | 3 | 5 | 7 | 9 | 15 | 31 | 65535 | | | | | | | | |
| SB18 | 3 | — | 3 | 5 | 7 | 9 | 15 | 31 | 65535 | | | | | | | | |
| SB19 | 3 | — | 3 | 5 | 7 | 9 | 15 | 31 | 65535 | | | | | | | | |
| SB20 | 3 | — | 3 | 5 | 7 | 9 | 15 | 31 | 65535 | | | | | | | | |
| SB21 | 3 | — | 3 | 5 | 7 | 9 | 15 | 31 | 65535 | | | | | | | | |
| SB22 | 3 | — | 3 | 5 | 7 | 9 | 15 | 31 | 65535 | | | | | | | | |
| SB23 | 2 | — | 3 | 5 | 65535 | | | | | | | | | | | | |
| SB24 | 2 | — | 3 | 5 | 65535 | | | | | | | | | | | | |
| SB25 | 2 | — | 3 | 5 | 65535 | | | | | | | | | | | | |
| SB26 | 2 | — | 3 | 5 | 65535 | | | | | | | | | | | | |
| SB27 | 0 | — | | | | | | | | | | | | | | | |
| SB28 | 0 | — | | | | | | | | | | | | | | | |
| SB29 | 0 | — | | | | | | | | | | | | | | | |
| SB30 | 0 | — | | | | | | | | | | | | | | | |
| SB31 | 0 | — | | | | | | | | | | | | | | | | sblimit = 27
Sum of nbal = 88

TABLE 2

| Number of steps | C | D | grouping | Samples per codeword | Bits per codeword |
|---|---|---|---|---|---|
| 3 | 1.33333333333 | 0.50000000000 | yes | 3 | 5 |
| 5 | 1.60000000000 | 0.50000000000 | yes | 3 | 7 |
| 7 | 1.14285714286 | 0.25000000000 | no | 1 | 3 |
| 9 | 1.77777777777 | 0.50000000000 | yes | 3 | 10 |
| 15 | 1.06666666666 | 0.12500000000 | no | 1 | 4 |
| 31 | 1.03225806452 | 0.06250000000 | no | 1 | 5 |
| 63 | 1.01587301587 | 0.03125000000 | no | 1 | 6 |
| 127 | 1.00787401575 | 0.01562500000 | no | 1 | 7 |
| 255 | 1.00392156863 | 0.00781250000 | no | 1 | 8 |
| 511 | 1.00195694716 | 0.00390625000 | no | 1 | 9 |
| 1023 | 1.00097751711 | 0.00195312500 | no | 1 | 10 |
| 2047 | 1.00048851979 | 0.00097656250 | no | 1 | 11 |
| 4095 | 1.00024420024 | 0.00048828125 | no | 1 | 12 |
| 8191 | 1.00012208522 | 0.00024414063 | no | 1 | 13 |
| 16383 | 1.00006103888 | 0.00012207031 | no | 1 | 14 |
| 32767 | 1.00003051851 | 0.00006103516 | no | 1 | 15 |
| 65535 | 1.00001525902 | 0.00003051758 | no | 1 | 16 |

TABLE 3

| index | scalefactor | index | scalefactor |
|---|---|---|---|
| 0 | 2.00000000000000 | 32 | 0.00123039165029 |
| 1 | 1.58740105196820 | 33 | 0.00097656250000 |
| 2 | 1.25992104989487 | 34 | 0.00077509816991 |
| 3 | 1.00000000000000 | 35 | 0.00061519582514 |
| 4 | 0.79370052598410 | 36 | 0.00048828125000 |
| 5 | 0.62996052494744 | 37 | 0.00038754908495 |
| 6 | 0.50000000000000 | 38 | 0.00030759791257 |
| 7 | 0.39685026299205 | 39 | 0.00024414062500 |
| 8 | 0.31498026247372 | 40 | 0.00019377454248 |
| 9 | 0.25000000000000 | 41 | 0.00015379895629 |
| 10 | 0.19842513149602 | 42 | 0.00012207031250 |
| 11 | 0.15749013123686 | 43 | 0.00009688727124 |
| 12 | 0.12500000000000 | 44 | 0.00007689947814 |
| 13 | 0.09921256574801 | 45 | 0.00006103515625 |
| 14 | 0.07874506561843 | 46 | 0.00004844363562 |
| 15 | 0.06250000000000 | 47 | 0.00003844973907 |
| 16 | 0.04960628287401 | 48 | 0.00003051757813 |
| 17 | 0.03937253280921 | 49 | 0.00002422181781 |
| 18 | 0.03125000000000 | 50 | 0.00001922486954 |
| 19 | 0.02480314143700 | 51 | 0.00001525878906 |
| 20 | 0.01968626640461 | 52 | 0.00001211090890 |
| 21 | 0.01562500000000 | 53 | 0.00000961243477 |
| 22 | 0.01240157071850 | 54 | 0.00000762939453 |
| 23 | 0.00984313320230 | 55 | 0.00000605545445 |
| 24 | 0.00781250000000 | 56 | 0.00000480621738 |
| 25 | 0.00620078535925 | 57 | 0.00000381469727 |
| 26 | 0.00492156660115 | 58 | 0.00000302772723 |
| 27 | 0.00390625000000 | 59 | 0.00000240310869 |
| 28 | 0.00310039267963 | 60 | 0.00000190734863 |
| 29 | 0.00246078330058 | 61 | 0.00000151386361 |
| 30 | 0.00195312500000 | 62 | 0.00000120155435 |
| 31 | 0.00155019633981 | | |

What is claimed is:

1. A method of evaluating an audio decoder, comprising the steps of:
   (a) sending an encoded audio bitstream to the audio decoder;
   (b) decoding said encoded audio bitstream by the audio decoder; and
   (c) observing an auditory sign corresponding to said encoded audio bitstream to evaluate the performance of the audio decoder.

2. The method of claim 1, wherein said encoded audio bitstream comprises an encoded sinewave and wherein said auditory sign comprises an audible tone if the audio decoder correctly decodes the encoded audio bitstream and a silence or noise if the audio decoder incorrectly decodes the encoded audio bitstream.

3. The method of claim 1, wherein said encoded audio bitstream comprises a waveform having a predefined peak amplitude and wherein said waveform is encoded using a set of scalefactors such that said predefined peak amplitude is maintained.

4. The method of claim 1, wherein said encoded audio bitstream comprises a waveform encoded with alternating scfsi values, an initial scfsi value and a second scfsi value.

5. The method of claim 1, wherein said encoded audio bitstream comprises a waveform encoded with alternating quantization levels, a reference quantization level and a test quantization level.

6. The method of claim 1, wherein said encoded audio bitstream comprises a waveform encoded with alternating stereo modes.

7. The method of claim 1, wherein said encoded audio bitstream comprises a anti-mono signal comprising two waveforms of equal amplitude and opposite phase.

8. The method of claim 1, wherein said encoded audio bitstream comprises a waveform encoded with alternating sample rates.

9. The method of claim 1, wherein said encoded audio bitstream comprises a waveform encoded with alternating types of de-emphasis.

10. The method of claim 1, wherein said encoded audio bitstream comprises a waveform encoded with a valid CRC-check word and said waveform encoded with an invalid CRC-check word.

11. The method of claim 1, wherein said sending step (a) comprises the steps of:
   (a1) sending an encoded audio bitstream having a waveform which is encoded using a plurality of parameters;
   (a2) changing a value of at least one of said plurality of parameters; and
   wherein said observing step (c) comprises the step of detecting a change in said auditory sign in response to said change in parameter.

12. An audio bitstream in a computer-readable medium for testing an audio decoder comprising a first waveform encoded with a plurality of parameters for producing an auditory sign, where a value of at least one of said plurality of parameters is changed to evaluate the audio decoder.

13. The audio bitstream of claim 12, wherein said first waveform is encoded with a scfsi parameter having a plurality of scfsi values, where said first waveform is encoded with alternating scfsi values separated by a period of silence.

14. The audio bitstream of claim 12, wherein said plurality of parameters includes a quantization parameter having a plurality of quantization levels, where said first waveform is encoded with alternating quantization levels producing a quantized waveform that is identical in all of said quantization levels.

15. The audio bitstream of claim 12, wherein said plurality of parameters includes a stereo mode parameter having a plurality of stereo modes, where said first waveform is encoded with alternating stereo modes producing an encoded waveform that is identical in all of said stereo modes.

16. The audio bitstream of claim 12, further comprises a second waveform, where said waveforms have equal amplitude and opposite phase, wherein said waveforms are encoded to opposing channels for each of a plurality of frequency ranges such that all of said plurality of frequency ranges are tested.

17. The audio bitstream of claim 12, wherein said plurality of parameters includes a sample rate parameter having a plurality of sample rates, where said first waveform is encoded with alternating sample rates separated by a period of silence.

18. The audio bitstream of claim 12, wherein said first waveform is further encoded with a pre-emphasis parameter having a plurality of de-emphasis types, where said first waveform is encoded with alternating de-emphasis types separated by a period of silence.

19. The audio bitstream of claim 12, wherein said first waveform is further encoded with a CRC-check parameter having a correct CRC-check word, where said first waveform is encoded with alternating correct CRC-check word and an incorrect CRC-check word.

20. An apparatus for testing an audio decoder comprising:
   means for generating an encoded audio bitstream;
   means, coupled to said generating means, for sending said encoded audio bitstream to the audio decoder; and
   means, coupled to the audio decoder, for observing an auditory sign corresponding to said encoded audio bitstream to evaluate the performance of the audio decoder.

* * * * *